(12) United States Patent
Ball

(10) Patent No.: US 12,365,260 B2
(45) Date of Patent: Jul. 22, 2025

(54) ANTI-CLONING TECHNIQUES FOR IDENTIFIER-BASED WIRELESS POWER TRANSFER

(71) Applicant: Wireless Advanced Vehicle Electrification, LLC, Salt Lake City, UT (US)

(72) Inventor: Steven Ball, Sandy, UT (US)

(73) Assignee: WIRELESS ADVANCED VEHICLE ELECTRIFICATION, LLC, Salt Lake City, UT (US)

( * ) Notice: Subject to any disclaimer, the term of this patent is extended or adjusted under 35 U.S.C. 154(b) by 761 days.

(21) Appl. No.: 17/583,099

(22) Filed: Jan. 24, 2022

(65) Prior Publication Data

US 2023/0234466 A1     Jul. 27, 2023

(51) Int. Cl.
    *B60L 53/65*       (2019.01)
    *B60L 53/12*       (2019.01)
    *B60L 53/66*       (2019.01)
    *B60L 53/68*       (2019.01)

(52) U.S. Cl.
CPC ............... *B60L 53/65* (2019.02); *B60L 53/12* (2019.02); *B60L 53/66* (2019.02); *B60L 53/68* (2019.02)

(58) Field of Classification Search
USPC .......................................................... 320/108
See application file for complete search history.

(56) References Cited

U.S. PATENT DOCUMENTS

| | | | | |
|---|---|---|---|---|
| 2011/0106329 | A1* | 5/2011 | Donnelly | B60L 53/665 320/109 |
| 2020/0387874 | A1* | 12/2020 | Chen | G06Q 20/02 |
| 2023/0234466 | A1* | 7/2023 | Ball | B60L 53/65 320/108 |

* cited by examiner

*Primary Examiner* — Mohammed Alam
(74) *Attorney, Agent, or Firm* — Kunzler Bean & Adamson; Bruce R. Needham

(57) ABSTRACT

Described herein are techniques for providing authorization of vehicle charging requests in a manner that limits losses to unauthorized parties. Such techniques may comprise receiving, from a charging station, a request to access power resources, the request related to an electric vehicle in proximity of the charging station, providing, to the electric vehicle, a dynamic verification value to be used in authentication of the electric vehicle, and receiving, from the electric vehicle, a transformed version of the dynamic verification value generated by the electric vehicle. The techniques may further comprise independently generating, based at least in part on the dynamic verification value, an expected verification value, and determining whether to authorize the request based on a determination as to whether the transformed version of the dynamic verification value matches the expected verification value.

20 Claims, 6 Drawing Sheets

ANTI-CLONING TECHNIQUES FOR IDENTIFIER-BASED WIRELESS POWER TRANSFER

BACKGROUND

As the world becomes more aware of the impact that the use of fossil fuels is having on the environment, the demand for environmentally friendly alternatives is increasing. In the realm of transportation, vehicles that are powered by fossil fuels are being replaced by electric vehicles. In some cases, entire fleets of transit vehicles, such as busses, are being replaced by electric vehicles. However, despite this increase in popularity, electric vehicles are subject to their own unique set of problems. For example, in many cases, fleets of electric vehicles that are used in public transportation may require frequent recharging. This may be facilitated via the placement of charging plates throughout transit routes of those electric vehicles. Such charging plates may be embedded within public roads, such that they may be accessible to vehicles that are not authorized to access power resources. In some cases, drivers of such vehicles may use sophisticated techniques to try to trick such charging plates into providing power.

SUMMARY

Techniques are provided herein for providing authorization of electric vehicle charging. In some embodiments, such techniques further provide for minimization of processing performed outside of a local computing device (e.g., a charge node). Such techniques comprise, upon receiving a request for charging by a vehicle, verifying the authenticity of the vehicle's identity, verifying that the vehicle has sufficient balance (in some cases, and granting or limiting access to power resources based on those verifications.

In one embodiment, a method is disclosed as being performed by a computing device that manages charging of vehicles via the use of charging plates, such as a charge node, the method comprising receiving, from a charging station, a request to access power resources, the request related to an electric vehicle in proximity of the charging station, providing, to the electric vehicle, a dynamic verification value to be used in authentication of the electric vehicle, receiving, from the electric vehicle, a transformed version of the dynamic verification value generated by the electric vehicle, independently generating, based at least in part on the dynamic verification value, an expected verification value, and determining whether to authorize the request based on a determination as to whether the transformed version of the dynamic verification value matches the expected verification value.

An embodiment is directed to a computing system comprising a processor; and a memory including instructions that, when executed with the processor, cause the computing device to, at least receive, from a charging station, a request to access power resources, the request related to an electric vehicle in proximity of the charging station, provide, to the electric vehicle, a dynamic verification value to be used in authentication of the electric vehicle, receive, from the electric vehicle, a transformed version of the dynamic verification value generated by the electric vehicle, independently generate, based at least in part on the dynamic verification value, an expected verification value, and determine whether to authorize the request based on a determination as to whether the transformed version of the dynamic verification value matches the expected verification value.

An embodiment is directed to a non-transitory computer-readable media collectively storing computer-executable instructions that upon execution cause one or more computing devices to collectively perform acts comprising receiving, from a charging station, a request to access power resources, the request related to an electric vehicle in proximity of the charging station, providing, to the electric vehicle, a dynamic verification value to be used in authentication of the electric vehicle, receiving, from the electric vehicle, a transformed version of the dynamic verification value generated by the electric vehicle, independently generating, based at least in part on the dynamic verification value, an expected verification value, and determining whether to authorize the request based on a determination as to whether the transformed version of the dynamic verification value matches the expected verification value.

The foregoing, together with other features and embodiments will become more apparent upon referring to the following specification, claims, and accompanying drawings. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
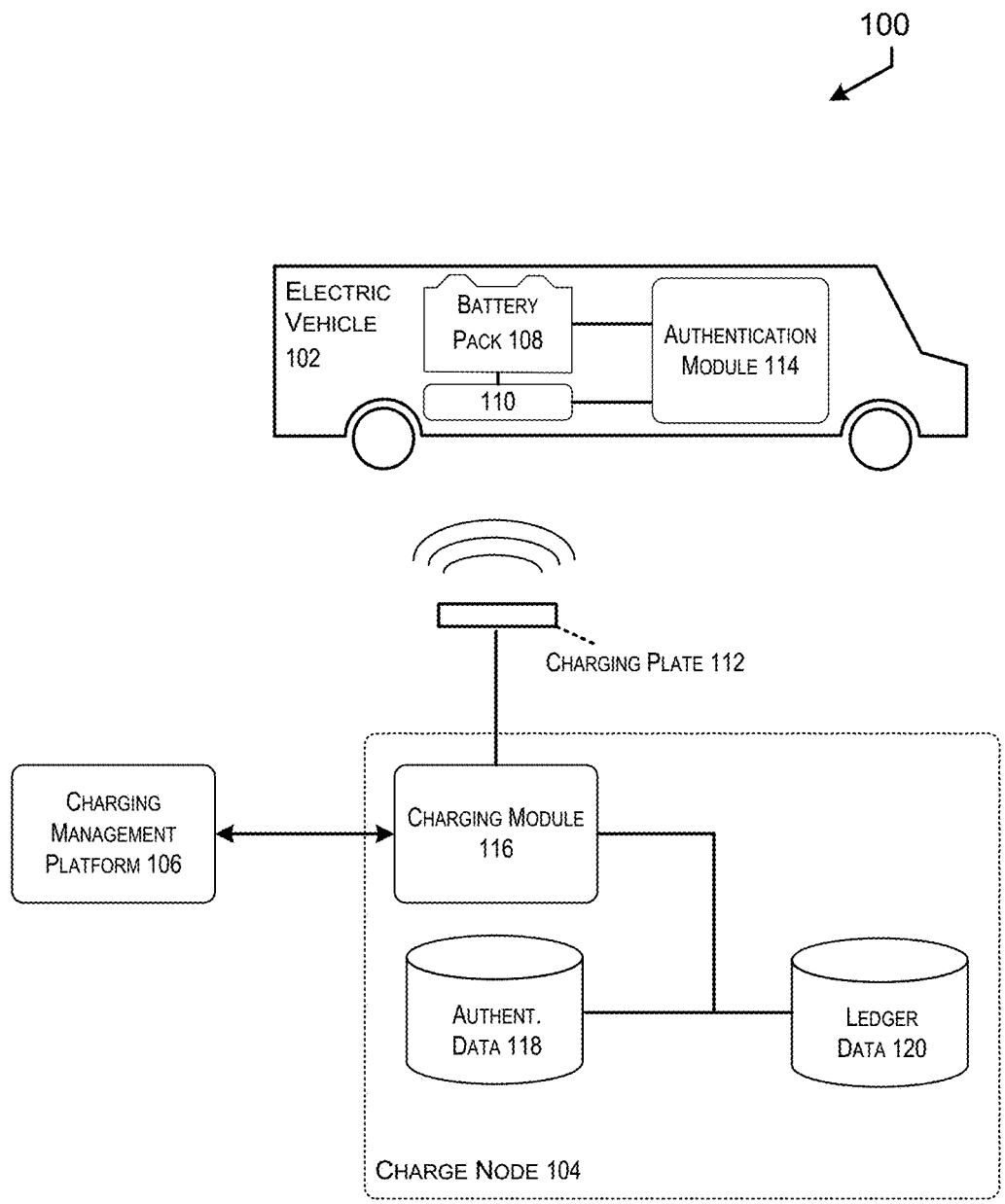
FIG. 1 illustrates an example computing environment in which anti-fraud techniques may be implemented to limit unauthorized use of power resources in accordance with at least some embodiments.

This disclosure is directed towards a system that prevents or limits power resources from being consumed by unauthorized parties. When an electric vehicle is positioned proximate to a wireless charging plate (e.g., over the charging plate), the charging plate and/or associated wireless modules may communicate with the electric vehicle to obtain identification information for that vehicle. The charging plate may then submit a request, along with the identification information, to a local computing device (e.g., a charge node) for access to a power resource to be used in charging the vehicle.

In embodiments, the authenticity of the vehicle may be verified by the charge node prior to authorizing access to the power resource. In some cases, this may comprise the charge node providing a dynamic verification value (e.g., a random number) to the vehicle. The vehicle may then apply one or more obfuscation, encryption and/or data transformation techniques (e.g., a hash algorithm) to the dynamic verification value to obtain an obfuscated, encrypted and/or transformed version of the dynamic verification value, which is passed back to the charge node. In some cases, the transformed version of the verification value may also be generated using data other than the dynamic verification value. For example, the transformed version of the dynamic verification value may be generated using a vehicle identifier for the vehicle and/or a token (or other secret data) stored in relation to the vehicle.

Additionally, the charge node may independently generate an expected verification value from the dynamic verification value using the same and/or complementary techniques as are used by the vehicle to generate the obfuscated transformed version of the dynamic verification value. The expected verification value is then compared to the transformed version received from the vehicle. If the two versions of the verification value match, then the vehicle is authenticated. By comparing the two versions of the dynamic verification value, the charge node can verify that the vehicle is in possession of the appropriate data transformation algorithm (which may be a secret algorithm) as well as any other secret data used to generate the transformed version, such as a token, algorithmic seed or other secret data.

In some embodiments, the charge node may be further configured to determine whether to authorize a charge request based on a balance or payment information for a vehicle. In some embodiments, such balance information is maintained in a ledger that is distributed across a network of charge nodes and updated each time that a transaction is conducted. In some embodiments, the ledger is a blockchain ledger wherein blocks of transactions are appended to the ledger and signed using an authorized entity's secret key. In such embodiments, the authenticity of the ledger can be verified using a public key associated with the authorized entity.

Embodiments of the disclosure provide numerous advantages over conventional systems. For example, the system disclosed herein enables restriction of access to power resources to unauthorized parties. In some environments, such as those that support electric vehicle public transportation, charging plates are embedded within the road to provide inductive charging of the vehicles as they stop over those charging plates. For example, charging plates may be embedded at bus stops or other charging stations. Because these areas are accessible to the public, other electric vehicle owners may attempt to charge their own vehicles using the charging plates.

An unauthorized vehicle may include any electric vehicle that is not authorized to use charging plates available to the system. In some embodiments, some vehicles may be authorized to use only a subset of the charging plates available and may be considered unauthorized vehicles with respect to the remainder of charging plates. In some systems, vehicle identifiers might be used to determine which vehicles are or are not authorized to access power from a charging plate. However, these vehicle identifiers can be "cloned" in order to disguise an unauthorized vehicle as an authorized vehicle. For example, an unauthorized vehicle may be programmed to provide a vehicle identifier for a bus operating on public transit instead of its own vehicle identifier when requesting access to power. In another example, an unauthorized vehicle may be programmed to perform a "replay attack" in which an authorization request generated by an authorized vehicle is intercepted by an unauthorized party and then "replayed" to the charging plate during a subsequent charging attempt. Embodiments of the disclosure herein enable restriction of power to unauthorized vehicles even when rather sophisticated attacks are used by the unauthorized vehicles.

Additionally, embodiments as described herein can enable local authorization of vehicle charging that provides additional benefits over conventional systems. It should be noted that when a network of charging stations (e.g., charging nodes) is sufficiently large, or when charging stations within that network are owned/operated by different entities, requesting authorization for charging from a centralized computing platform (e.g., a charge management platform) may become burdensome. Periods of high-traffic time during which a high number of requests for charging are received can result in a backlog of authorization requests. Because such charging requests pertain to vehicles on a public road, such a backlog can result in an increase vehicle charging wait times and a corresponding increase in traffic congestion. Accordingly, it may be advantageous to perform authorization of vehicle charging requests locally (i.e., at a charging node) using techniques that do not involve significant external communication. Embodiments are described herein that provide for local authorization of vehicle charging using ledger data that is distributed throughout a network of charge nodes.

FIG. 1 illustrates a computing environment in which anti-fraud techniques may be implemented to limit unauthorized use of power resources. In some embodiments of the computing environment 100, charging of one or more electric vehicle 102 is managed by one or more charge nodes 104 that may be in communication with a charge management platform 106. In at least a portion of these embodiments, the charge node is in continuous or semi-continuous communication with the charge management platform via a communication channel.

An electric vehicle 102 may include any suitable mode of transportation that operates primarily using electric current, e.g., using one or more electric motors to cause the electric vehicle to move. In some embodiments, electric current available to a particular electric vehicle may be limited based on a capacity of a battery or other electric storage medium, such as a battery pack 108. In some embodiments, the charge on a battery pack of the electric vehicle may be restored at least partially throughout a vehicle's operation. For example, in the case that the electric vehicle is a bus that makes stops along a route, the battery of the electric vehicle may be recharged at least partially each time that the bus positions itself over a charging pad located at one of the bus stops.

As noted above, the electric vehicle may include a battery pack 108 that is configured to power the electric vehicle. The battery pack may be communicatively coupled to a charge interface 110 that is configured to receive power from a charging plate 112 and direct that power to the battery pack. In some embodiments, the electric vehicle may include an authentication module 114 that is configured to provide authentication data to the charging plate in order to obtain access to the power provided by that charging plate. In some cases, the authentication data provided by the authentication module may comprise a hash value or other obscured, encrypted and/or transformed value.

A charge node 104 may include any computing device or combination of computing devices configured to perform at least a portion of the functionality described herein. Charge node may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Charge node can include one or more virtual machines running virtual operating systems, or other computing architectures involving virtualization such as one or more flexible pools of logical storage devices that can be virtualized to maintain virtual storage devices for the computer. In some embodiments, a number of charge nodes may be distributed throughout a geographic region, each charge node in proximate communication with a charging plate.

The charge node 104 may include one or more software modules configured to limit or otherwise restrict access to power resources, such as charging module 116. In some cases, the charge node may maintain data that may be used by the charging module to determine whether to restrict access of one or more vehicles to power to be provided via one or more charging plates. For example, the charge node may maintain authentication data 118 that includes information on vehicles that are, or are not, authorized to access power resources managed by that charge node (e.g., a whitelist and/or blacklist). In another example, the charge node may maintain ledger data 120 that stores a distributed ledger (e.g., a blockchain ledger) that can be used to identify account balances/usage.

In embodiments, at least a portion of the data stored in the authentication data 118 and/or ledger data 120 may be provided by a charging management platform that acts as a centralized processor. In some cases, at least a portion of the authentication data 118 and/or ledger data 120 may be passed between charge nodes. For example, a number of charge nodes distributed throughout a region may form a distributed network. It should be noted that in such a distributed network, the charge nodes may be operated/owned by different entities or organizations. In some cases, a charging management platform may manage billing between each of those different entities. In some cases, such billing may be managed based on information maintained about vehicle charging/usage (e.g., ledger data 120).

Within a charge node, access to charging may be managed by a charging module 116. In some embodiments, the charging module may be configured to receive information about a vehicle from a charging plate, determine whether the information is valid, and either authorize or decline the charging of the vehicle based on that determination. In some embodiments, such a determination is made based upon providing a value to the vehicle, receiving an obscured version of that value, and determining whether the obscured version of the value matches an expected value.

Figure 2:
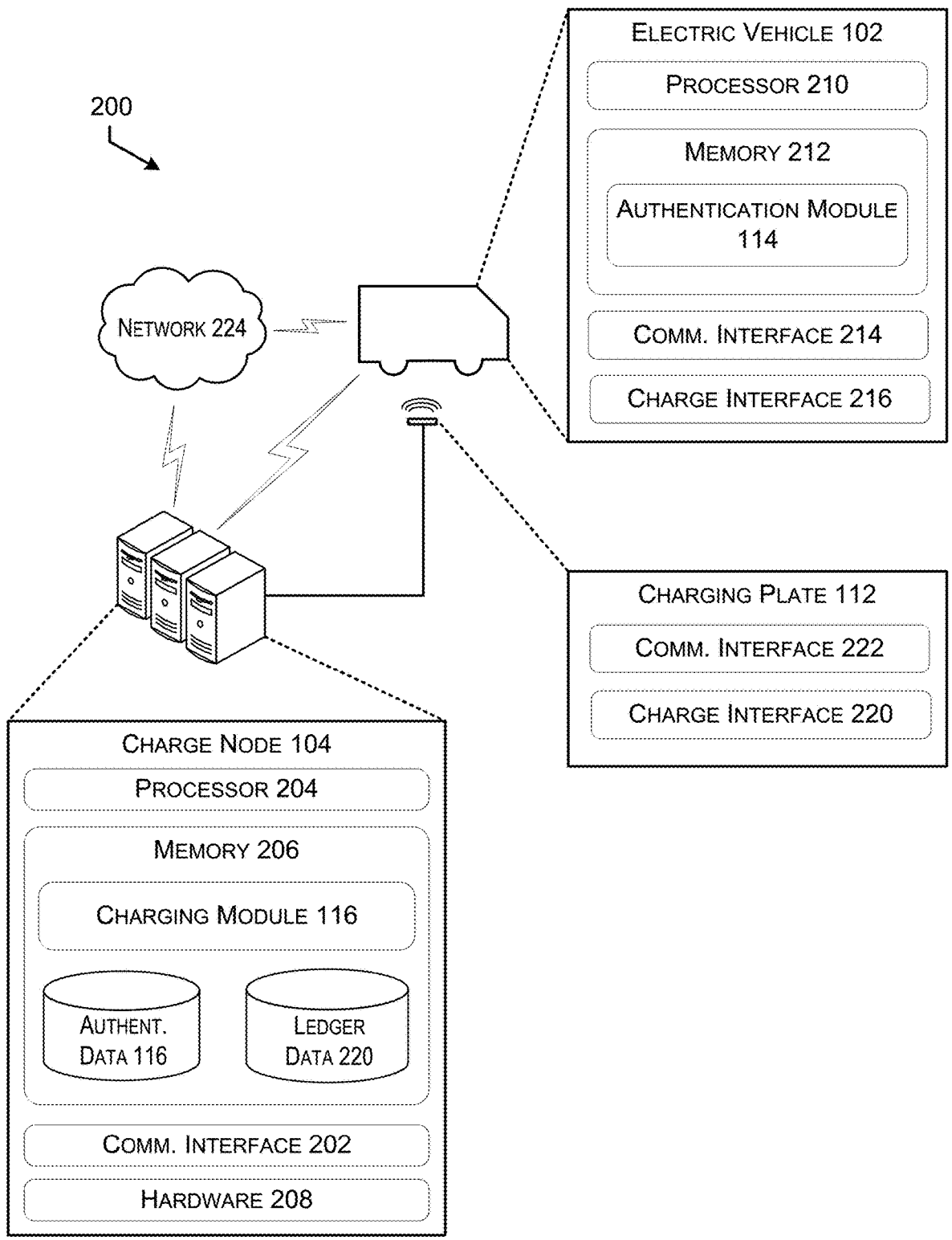
FIG. 2 illustrates a block diagram showing various components of an example system architecture that supports restriction of power to unauthorized parties in accordance with at least some embodiments.

FIG. 2 illustrates a block diagram showing various components of a system architecture that supports restriction of power to unauthorized parties in accordance with some embodiments. The system architecture 200 may include a number of charge nodes 104, each of which may be in communication with one or more charging plates 112. In some embodiments, the charge node may be in communication with a charge management platform and/or one or more electric vehicles 102.

As noted above, a charge node 104 can include any computing device configured to perform at least a portion of the operations described herein. The charge node 104 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The charge node 104 can include one or more virtual machines running virtual operating systems, or other computing architectures involving virtualization such as one or more flexible pools of logical storage devices that can be virtualized to maintain virtual storage devices for the computer. For example, the charge node 104 may include virtual computing devices in the form of virtual machines or software containers that are hosted in a cloud.

The charge node 104 may include a communication interface 202, one or more processors 204, memory 206, and hardware 208. The communication interface 202 may include wireless and/or wired communication components that enable the charge node 104 to transmit data to, and receive data from, other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 204 and the memory 206 of the charge node 104 may implement functionality that includes one or more software modules and data stores. Such software modules may include routines, program instructions, objects, and/or data structures that are executed by the processors 204 to perform particular tasks or implement particular data types. More particularly, the memory 206 may include at least a module that is configured to manage access to power resources as provided via one or more charging plates (e.g., charging module 116). Additionally, the charge node may maintain one or more data stores having data to be used by the charging module to make a determination as to whether or not to grant access. For example, the charge management platform may include authentication data 116, that includes an indication of what vehicles/drivers are authorized to access power resources, and/or ledger data 118, that includes information in a distributed ledger, such as a blockchain ledger.

A charging module 116 may be configured to, in conjunction with the processor 204, determine whether or not to authorize charging of a vehicle. Such an authorization determination may be made based on whether the vehicle is able to be authenticated using the techniques described herein. In some cases, such an authorization determination may also be made based on whether sufficient funds are available in relation to the vehicle.

As noted above, the charging module may be configured to authenticate a vehicle that is requesting charging from a charging station. In some cases, such authentication may comprise providing a value (e.g., a randomly generated numeric value) to the vehicle and determining whether a transformed value received from the vehicle in response matches an expected value. For example, upon receiving a request for charging from a charging plate, the charging module may provide a randomly generated number to the charging plate to be conveyed to the vehicle. In response to providing that randomly generated number, the charging module may receive a transformed value from the vehicle (via the charging plate). Upon receiving the transformed value, the charging module may be configured to verify the authenticity of the transformed value by comparing it to an expected value, which may have been independently generated by the charging module using an obfuscation technique (e.g., a hashing or encryption technique). If the received transformed value matches the expected value, then the charging module may determine that the vehicle is authenticated. It should be noted that the use of a randomly generated numeric value in the manner described herein may be used to prevent a replay attack by an unauthorized vehicle.

In some cases, the charging module may further obtain a vehicle identifier or other value from the vehicle in the received request. In such cases, the vehicle identifier may first be compared against a whitelist or a blacklist to determine whether the vehicle identifier qualifies to be provided with power before any authentication is performed. In some embodiments, an expected value to be compared to a received transformed value may be generated at least in part from a value that has been received from the vehicle. For example, a transformed value and an expected value may both be independently generated (by the vehicle and charge node respectively) by hashing both a numeric value that has been randomly generated by the charge node and a value received from the vehicle (such as a vehicle identifier).

In some embodiments, the charging module may be further configured to determine whether sufficient funds can be obtained with respect to the vehicle to be charged. In some cases, this may be done by obtaining authorization for a predetermined amount from an issuer associated with the vehicle over a payment processing network. For example, the charging module may obtain pre-authorization from an issuer associated with a credit line (e.g., a credit card) that is on record with respect to the vehicle. In some embodiments, this may be done by verifying a balance associated with the vehicle as maintained in relation to an account managed by a charge management platform or via ledger data stored locally at the charge node.

The charging module may be configured to restrict access to power in a number of different ways. In some embodiments, the charging module may outright deny the request for access to power. In some embodiments, the charging module may restrict or limit the amount of power that is provided to the requesting vehicle. For example, upon failing to authenticate a vehicle, the charging module may make a determination to allow the vehicle to charge, but at a reduced rate or to a reduced maximum amount.

A noted elsewhere, an electric vehicle 102 may comprise any suitable vehicle that is primarily powered using electrical current. In addition to including various components required to enable transit, the electric vehicle may include one or more processors 210, a memory 212, a communication interface 214, and charge interface 108.

The one or more processors 210 and the memory 212 of the charge node 104 may implement functionality that includes one or more software modules and data stores. Such software modules may include routines, program instructions, objects, and/or data structures that are executed by the processors 210 to execute one or more functions of the electric vehicle. More particularly, the memory 212 may include at least a module that is configured to facilitate authentication of the vehicle to a charging plate (e.g., authentication module 114).

An authentication module 112 may be configured to, in conjunction with the processor 210, provide access credentials to a charging plate in order to initiate a charging session. In some embodiments, the authentication module is configured to receive information provided by a vehicle requesting authentication via the charging plate, obfuscate or otherwise transform that information using one or more obfuscation techniques, and return a transformed value to the vehicle requesting authentication via the charging plate. For example, the charging plate may receive a numeric value (e.g., a randomly generated numeric value) from the charging plate. In this example, the authentication module may apply one or more hashing or encryption techniques to the numeric value in order to generate a transformed value. That transformed value may then be passed back to the charging plate, and subsequently to the charge node, where it may be compared to an expected value. Authentication of the vehicle may occur if the transformed value matches the expected value. In some cases, the vehicle also passes a unique value to the charging plate (e.g., a vehicle identifier, a token, or any other suitable value) that is used during the obfuscation technique to generate the transformed value. Such a unique value may be stored by the vehicle for use in authentication. In some embodiments, the unique value is a vehicle identifier associated with the vehicle. In some embodiments, the unique value is a token provided by an operator or owner of the vehicle. Such a token may be specific to the vehicle or may be used by each vehicle in a fleet of vehicles. In some embodiments, the token may be temporary (e.g., good for a predetermined amount of time). In some embodiments, the token may be geographically limited (e.g., usable at particular charging plates). In some embodiments, the token may be associated with a particular amount of money or an amount of charge to be provided to the vehicle.

In some embodiments, the charge management platform may be in communication with at least one charging plate 218. A charging plate may be any device or mechanism capable of providing wireless transmission of power (e.g., inductive charging) to an electrical vehicle located in proximity of the charging plate via a charge interface 220. In some embodiments, the charging plate may be configured to communicate with an electric vehicle in its proximity (e.g., to receive a vehicle identifier, etc.) via a communication interface 222.

Figure 3:
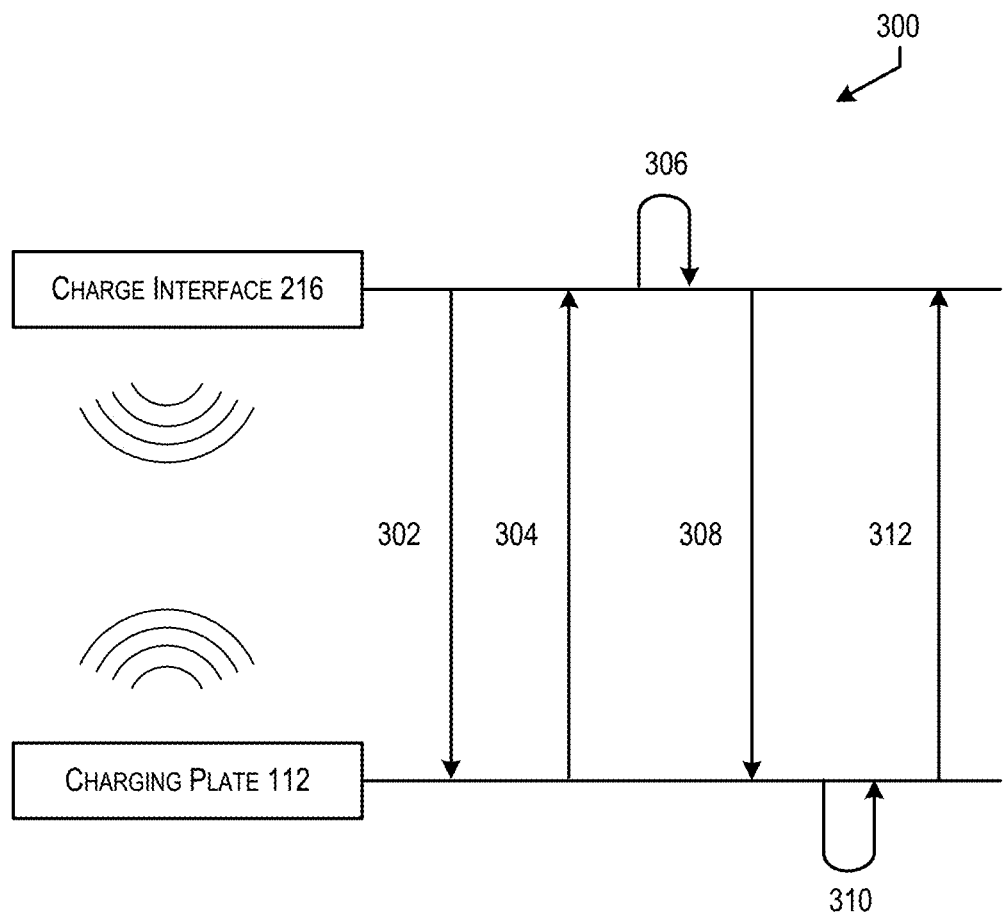
FIG. 3 illustrates a flow chart of an example process by which access to a power source may be granted or restricted in accordance with at least some embodiments.

FIG. 3 illustrates a flow chart process by which access to a power source may be granted or restricted in accordance with at least some embodiments. In some embodiments, the process 300, as depicted in FIG. 3, may involve a number of interactions between a charge node (e.g., charge node 104 of FIG. 1) and an electric vehicle (e.g., electric vehicle 102 of FIG. 1). Such interactions may be facilitated via a communication session established between a charging plate 112 in communication with the charge node and a charge interface 216 of an electric vehicle.

In some embodiments, the process 300 may be initiated by a charge interface of an electric vehicle at 302 upon being positioned proximate to a charging plate. In such embodiments, the charge interface may be configured to detect the presence of the charging plate and automatically initiate a charging request. For example, upon an electric vehicle being positioned (e.g., parked) above a charging plate, a charge interface of the electric vehicle may automatically (e.g., without human interaction) initiate communication with the charging plate in order to request charging. In some embodiments, information to be used in authorizing the charging request, such as a vehicle identifier, may be passed from the charge interface to the charging plate at that time. In some embodiments, the process 300 may instead be initiated by a charging plate upon detecting the presence of a vehicle in its proximity.

At 304 of the process 300, the charging plate may provide a verification value to the charge interface. In some cases, the verification value may comprise a dynamic numeric value. Such a dynamic numeric value may comprise a numeric value that has been randomly generated by a charge node in communication with the charging plate. In another example, the verification value may comprise a reference that may be used along with a lookup table to identify a value to be used in authentication.

It should be noted that while the process 300 depicts a verification value being provided to the vehicle by the charging plate, such a verification value may instead be provided to the vehicle prior to the process 300 via a different device/communication mechanism. In some embodiments, a token or other shared secret data value may be provided to at least one vehicle as well as to the charge node to be stored in association with that vehicle. In some embodiments, the token (e.g., a shared secret key) may be provisioned onto the vehicle by an operator of that vehicle using any suitable technique. The same token may be provided to a charge node via a charge management platform or other suitable computing device. In some embodiments, the shared secret data may be embedded into firmware and/or hardware and distributed as part of communications modules for mobile and stationary charging assemblies.

By way of illustration, in the case that the vehicle is a transit bus, a token may be provisioned onto each transit bus before it begins its route. By way of illustration, each transit bus may be provisioned with a token or other verification value at the beginning of each day as it comes within wireless communication range of a beacon located in a bus transit station. In some cases, such a token provisioned onto each vehicle may be unique to that vehicle. In some embodiments, such a token provisioned onto each vehicle may be associated with the fleet of vehicles.

At 306 of the process 300, an authentication module in communication with the charge interface may apply one or more obfuscation techniques to the verification value in order to obtain a transformed version of the verification value. A transformed version of the verification value may be any value that cannot readily be used to obtain the verification value. In some embodiments, this comprises applying a hashing algorithm or an encryption algorithm to the verification value. In some cases, one or more additional data may be used to generate the transformed value in addition to the verification value. For example, a vehicle identifier for the vehicle may be used to generate the transformed value in addition to the verification value. In some embodiments, a token provisioned onto a memory included in the vehicle is used to generate the transformed value in addition to the verification value.

At 308 of the process 300, the transformed value that was generated by the vehicle is provided to the charging plate, which is subsequently provided to the charge node. At 310 of the process 300, the charge node may compare the received transformed value to an expected value. In some embodiments, the expected value may be independently generated by the charge node using the same techniques that were used to generate the transformed version of the verification value. In some embodiments, the charge node may be provided with a token or other shared secret data that may be used to generate the expected value prior to the performance of the process 300.

Upon making a comparison of the transformed value to the expected value, a determination may be made as to whether or not to authorize the request for charging based on whether the two values match. As noted elsewhere, if the transformed value does not match the expected value, then a determination may be made that the charging request is not to be authorized. If, on the other hand, the transformed value matches the expected value, then a determination may be made that the charging request is to be authorized.

It should be noted that authentication (e.g., verifying the authenticity of an identity) is different from authorization (e.g., approving a transaction). In some embodiments, authorization may depend not only upon authentication as described above, but also upon the availability of funds. In some embodiments, the process 300 may further comprise determining whether sufficient funds are available to cover the requested charging. In some cases, such authorization may not be necessary. For example, a vehicle may be provided unlimited access to power resources. In some cases, this may comprise receiving authorization for a pending transaction from an issuer of an account associated with the vehicle. In some cases, this may comprise consulting a ledger or balance maintained in relation to the vehicle.

At 312 of the process 300, upon determining that the charging request is to be authorized, the charging plate may be configured to transmit power to the charge interface. Alternatively, the charging plate may be configured to provide a rejection or error code to the charge interface upon determining that the charging request is to be declined. In some embodiments, the amount of power provided to the vehicle at 312 may be capped or otherwise restricted.

Figure 4:
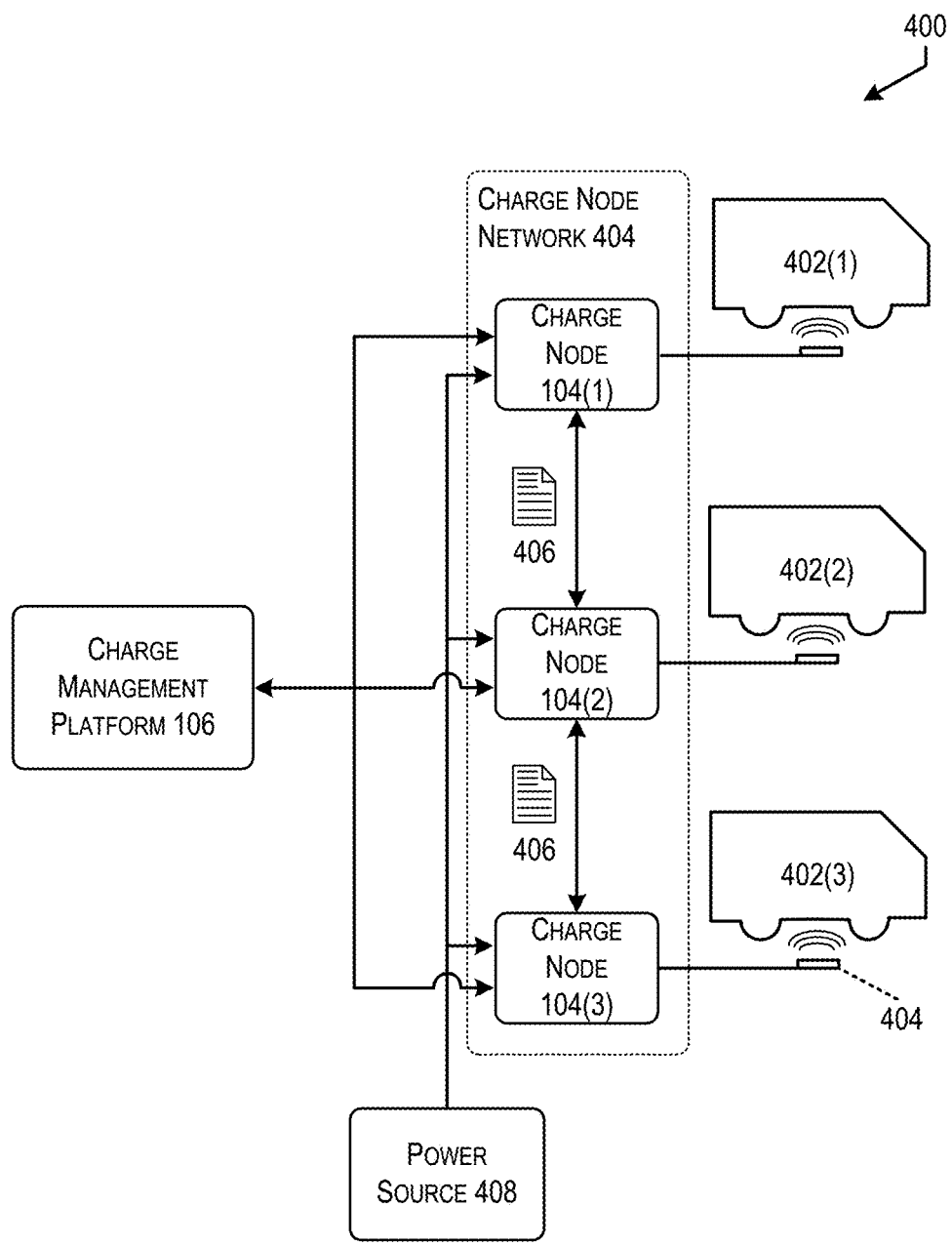
FIG. 4 depicts an example vehicle charging environment that may be implemented to manage authorization of electric vehicle charging in accordance with at least some embodiments.

FIG. 4 depicts a vehicle charging environment that may be implemented to manage authorization of electric vehicle charging in accordance with at least some embodiments. In some embodiments, the environment 400 depicted in FIG. 4 may be implemented to service a number of electric vehicles 402 within region or area. In such embodiments, a charge node network 104 may include a number of charge nodes 104 (1-3) located throughout the region or area, with each of those charge nodes in communication with a respective charging plate 404. The charging plates may be embedded in roadways or other accessible areas throughout the region or area.

Each of a number of electric vehicles 402 (e.g., electric vehicles 402 (1-3)) may be configured to interact with the charging plates 404 in order to receive a power transfer (e.g., via inductive charging). An electric vehicle may be positioned over a respective charging plate 404, and each charging plate may be configured to provide power to the electric vehicle positioned above it. Such power may be provided by the charging plate to the electric vehicle via either wired or wireless means. In some embodiments, the charging plate may receive information from the electric vehicle (and/or a battery pack installed within the vehicle), such as an identifier and/or status information, which may be relayed to a respective charge node in communication with the charging plate. In some cases, a charge node may be in communication with multiple charging plates.

Power may be distributed to each of a number of charging plates by the respective charge node 104. In some embodiments, the charge node may receive (either from a charging plate or from an electric vehicle) an indication of which electric vehicle is positioned at which of its respective charging plates. The charge node may receive charge requests from one or more of the charging plates in communication with it and may subsequently determine whether or not to authorize each of those received requests based on whether the vehicle is authenticated and, in some cases, whether the vehicle is associated with sufficient funds to cover the charge request. Based on such an authorization, the charge node may further determine whether to grant access to, or to limit access to, power that is to be distributed to one or more of the charging plates to be used in charging a respective electric vehicle.

In some embodiments, each respective charge node of a charge node network may make an authorization determination based on conducting an authentication process. In some cases, such an authorization determination may be further made based on a determination as to whether the vehicle associated with the charge request has sufficient funds to cover the charge request. An example of an authentication process that may be performed is described in greater detail with respect to FIG. 3 above. In some embodiments, information about a balance or charging for a vehicle may be maintained in a ledger 406 that is distributed across the charge node network. The ledger may be electronically signed by one or more parties, such that the authenticity of the ledger may be verified. In embodiments in which a ledger 406 is distributed across a charge node network, a charge node may access the ledger to determine whether a vehicle has a sufficient balance prior to authorizing a charge request. In some embodiments, the charge node may further append information about a completed charge request to the ledger and distribute that ledger to other charge nodes in the network of charge nodes.

In some embodiments, each of the charge nodes in a charge node network may communicate with a charge management platform 106. In some embodiments, the charge management platform may act as a centralized computing device and may distribute verification data (e.g., tokens, etc.) to each of the relevant charge nodes. In some cases, such data associated with a particular vehicle is only provided to charge nodes that the vehicle is authorized to receive charging from.

In some embodiments, the charge management platform may be configured to update and distribute ledger data. For example, in order to prevent multiple charge nodes from attempting to create competing new versions of a ledger, it may be the case that only the charge management platform is capable of writing (e.g., creating a new "block") to that ledger. In such embodiments, the charge node may be capable of checking a balance for a vehicle as indicated in the ledger and may then provide the details of the completed transaction to the charge management platform (which may occur after the vehicle has left the charging plate). The charge management platform may then add the details of that transaction (as well as co-occurring transactions) to the ledger and distribute the new version of that ledger to the charge nodes in the charge node network. In some cases, the new version of the ledger may be signed using a private key associated with the charge management platform.

It should be noted that the embodiments of the system as described herein enable and facilitate independent operation of a charge node. More particularly, using embodiments as described herein, each charge node of the charge node network may be operated/owned by a different entity. In such embodiments, each such charge node is capable of independently authenticating and authorizing charging locally (e.g., without requiring authentication/authorization to be performed by a centralized server).

In the depicted vehicle charging environment, each charge node may be in communication with an energy grid that supplies power to one or more charging plates. Such an energy grid may draw power from at least one power source 408. In some embodiments, the power source may include at least one external source of power and/or at least one energy storage device, such as a battery. Grid-level energy storage can reduce supply and demand mismatch by shifting energy from times of low demand to high demand, or from times when external power is cheap to when it is expensive. Additionally, energy storage can be charged or discharged rapidly, which can reduce the dependency on fast (e.g., high current) external power sources. In some embodiments, such an energy storage device can provide power quality, load shifting, load leveling, energy management, frequency regulation, backup power, voltage support, and/or grid stabilization.

Figure 5:
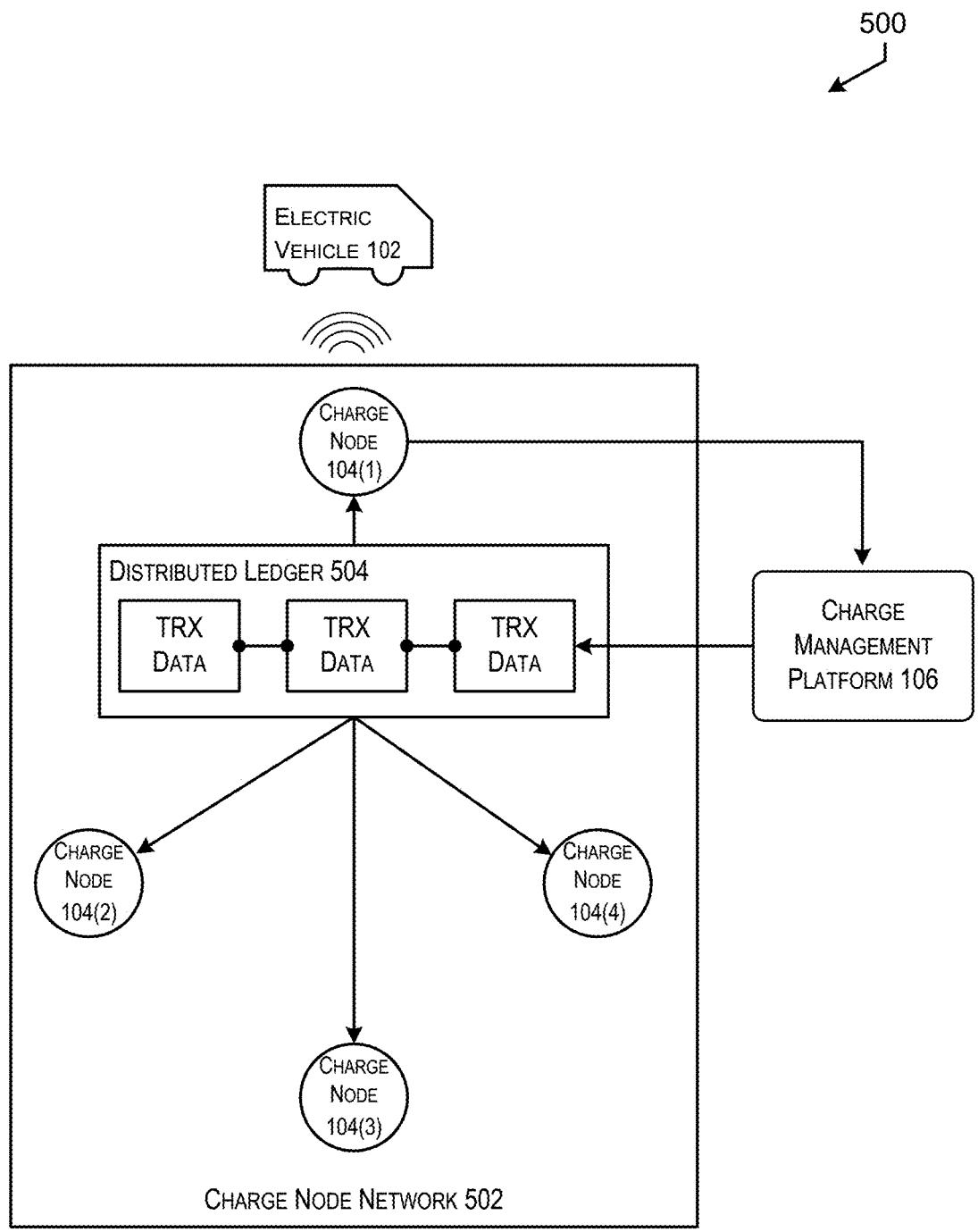
FIG. 5 depicts a block diagram of an example process for verifying, updating, and redistributing a ledger for use with a charge node network in accordance with at least some embodiments.

FIG. 5 depicts a block diagram of a process for verifying, updating, and redistributing a ledger for use with a charge node network in accordance with at least some embodiments. In embodiments of the process 500, an electric vehicle may be positioned proximate to a charge node 104 of a charge node network 502 in order to request charging. As noted elsewhere, charge node network may include a number of charge nodes (e.g., charge nodes 104 (1-4)) that are distributed throughout a geographic region. Each of such charge nodes may be in communication with one or more proximate charging plates. It should be noted that the charge nodes in the charge node network may be owned and/or operated by different entities.

As noted elsewhere, prior to authorizing a request for charging, a charge node may determine whether a vehicle, or an account for that vehicle, has sufficient funds to pay for such a charge request. In some embodiments, this involves checking a distributed ledger 504 that is maintained at each charge node in the charge node network. The distributed ledger may be a blockchain ledger that includes a number of "blocks" that each include transaction (TRX) data. Each block in such a distributed ledger may be signed using a private key of an entity that appended the respective block to the distributed ledger. In some embodiments, such blocks may be appended to the distributed ledger by a charge node. In some embodiments, such blocks may be appended to the distributed ledger by a charge management platform 106 in communication with the charge node network. In some embodiments, each time that the ledger is updated to include a new block, that ledger is then distributed to each of the charge nodes in the network of charge nodes. In some embodiments, different charge nodes may maintain different portions of the distributed ledger (e.g., according to the distributed ledger algorithm) while having the ability to reach consensus on ledger facts utilizing a suitable consensus mechanism provided by the distributed ledger. In some embodiments, a distributed ledger can enable the cooperation of multiple independent entities without requiring a hierarchy of trust among the entities such as may be required for the case of a single authoritative ledger. In some embodiments, distributed ledgers may support digital contracts that can be used to define and automatically verify transactions among the entities. As one example, the digital contracts can specify that suitable anti-cloning measures be utilized as part of a valid transaction.

By way of illustrating interactions that involve a distributed ledger as described herein, consider the following scenario. In this scenario, a vehicle may park over a charging plate that is in communication with a charge node. Upon parking over the charge plate, a request for charging may be generated and transmitted to the charge node automatically. The charge request may include a vehicle identifier that can be used to identify the vehicle.

Upon receiving the charge request, the charge node may authenticate the vehicle as described elsewhere. Additionally, the charge node may obtain information about an account associated with the vehicle from a distributed ledger. This may involve identifying each of the transactions pertaining to the vehicle and determining a current balance for that vehicle based on the sequence of transactions in the distributed ledger. For example, such a balance may be determined based on each of the balance increases and decreases identified in relation to that vehicle up to a current date and time. In some embodiments, before determining a balance for the vehicle, the charge node may first verify the authenticity of the distributed ledger. This may be done by checking a signature of the ledger using a public key associated with the last entity that signed the ledger.

Upon obtaining a balance associated with the vehicle, the charge node may determine whether that balance is sufficient to cover an amount associated with the charge request. Upon determining that the balance is insufficient to cover the amount, the charge request may be declined. Upon determining that the balance is sufficient to cover the amount, the charge request may be authorized. In some embodiment, upon completion of charging associated with the charge request, a new transaction may be added to the distributed ledger that reflects the charge request. In some cases, the new transaction is added to the distributed ledger by the charge node. In other cases, the charge node may pass the information about the vehicle charging to a charge management platform, which may then generate a new "block" of transactions to be added to the distributed ledger. Once the transaction is added to the distributed ledger, the ledger is signed using a private key associated with the signing entity and the updated ledger is distributed to each charge node in the network of charge nodes.

Figure 6:
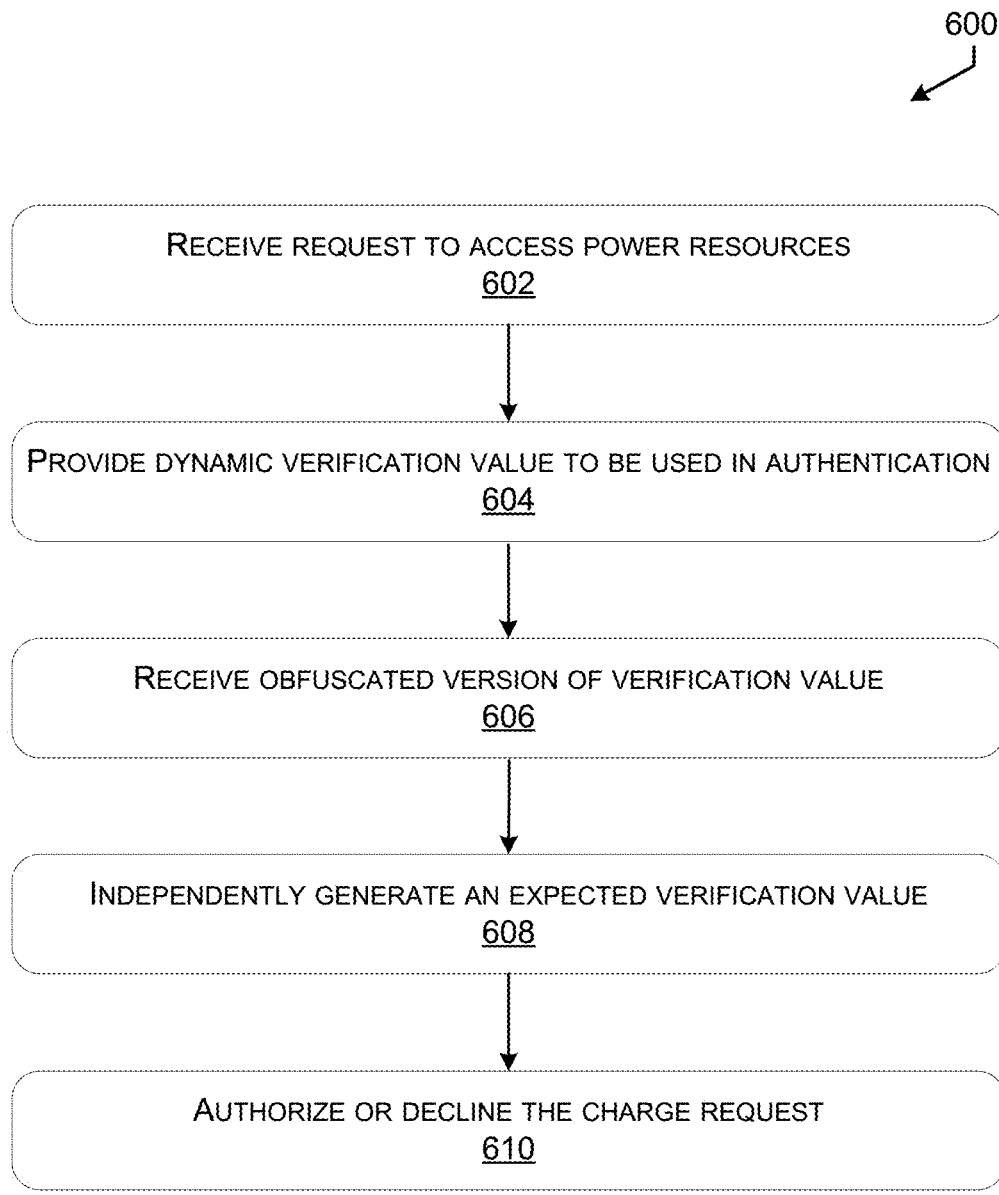
FIG. 6 depicts a flow diagram showing an example process 600 for determining whether to authorize or limit access to power resources in accordance with at least some embodiments.

FIG. 6 depicts a flow diagram showing an example process flow 600 for determining whether to authorize or limit access to power resources in accordance with embodiments. The process 600 may be performed by a computing device that is configured to generate and provide a product strategy for a product. For example, the process 600 may be performed by a computing device configured to manage at least a portion of fleet operations, such as the charge node 104 described with respect to FIG. 1 above. In some embodiments, the charge node is included in a network of charge nodes that is geographically distributed throughout a region.

At 602, the process 600 comprises receiving, from a charging station, a request to access power resources. The received request is related to an electric vehicle that is in proximity of the charging station. Such a charging station may include a charging plate as described herein.

At 604, the process 600 comprises providing a dynamic verification value to the electric vehicle to be used in authentication of the electric vehicle. In some embodiments, the dynamic verification value comprises a randomly generated numeric value. In other embodiments, the dynamic verification value comprises a date or timestamp.

At 606, the process 600 comprises receiving, from the electric vehicle, a transformed version of the dynamic verification value. In some embodiments, the transformed version of the dynamic verification value is generated by applying a hash algorithm to the dynamic verification value. In some embodiments, the transformed version of the dynamic verification value is further generated using secret data stored independently by both the electric vehicle and the charge node. For example, the transformed version of the dynamic verification value may also generated based on a token stored in relation to the vehicle. In some embodiments, the secret data is distributed to the charge node prior to the request. For example, the secret data is provided to the charge node by a charge management platform. In some embodiments, the secret data is provisioned onto the electric vehicle by a beacon in proximity to the electric vehicle. For example, the secret data may be provisioned onto the electric vehicle wirelessly via a beacon located in proximity to that vehicle. In some cases, the secret data is specific to the electric vehicle or specific to a fleet of electric vehicles.

At 608, the process 600 comprises independently generating, based at least in part on the dynamic verification value, an expected verification value. In some embodiments, the expected verification value is generated using the same techniques as the transformed version of the dynamic verification value.

At 610, the process 600 comprises determining whether to authorize the request based on a determination as to whether the transformed version of the dynamic verification value matches the expected verification value.

In some embodiments, the determination to authorize the request is also based on determining that sufficient funds are associated with the vehicle to cover the charge request. In some embodiments, determining that sufficient funds are associated with the vehicle to cover the charge request comprises obtaining preauthorization from an issuer associated with an account for the vehicle. In some embodiments, determining that sufficient funds are associated with the vehicle to cover the charge request comprises determining a balance associated with the vehicle from a distributed ledger. For example, the charge node may access a distributed ledger maintained by that charge node in order to obtain information about the vehicle, wherein the determination to authorize the request is also based on the information about the vehicle.

In some embodiments, the process 600 further comprises upon determining to authorize the request, directing power from a power resource to the charge station to be used in charging the vehicle. In some embodiments, the process 600 comprises updating the distributed ledger by appending a transaction record associated with the request, and distributing the updated distributed ledger to one or more additional charge nodes.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

The invention claimed is:

1. A method comprising:
receiving, from a wireless power transfer ("WPT") charging station, a request to access power resources, the request related to an electric vehicle in proximity of the WPT charging station, wherein the request is received wirelessly;
providing, to the electric vehicle, a dynamic verification value to be used in authentication of the electric vehicle, the dynamic verification value comprising a value that is associated with the electric vehicle;
receiving, from the electric vehicle, a transformed version of the dynamic verification value generated by the electric vehicle, wherein the transformed version of the dynamic verification value comprises an output of a transformation algorithm at the electric vehicle that transforms the dynamic verification value;
independently generating, based at least in part on the dynamic verification value and using a same transformation algorithm as the transformation of the electric vehicle, an expected verification value; and
determining whether to authorize the request based on a determination as to whether the transformed version of the dynamic verification value matches the expected verification value.

2. The method of claim 1, wherein the transformed version of the dynamic verification value is generated by applying a hash algorithm to the dynamic verification value.

3. The method of claim 1, wherein the expected verification value is generated using the same techniques as the transformed version of the dynamic verification value.

4. The method of claim 1, further comprising, upon determining to authorize the request, directing power from a power resource to the charge station to be used in wirelessly charging the vehicle.

5. The method of claim 1, wherein the determination to authorize the request is also based on determining that sufficient funds are associated with the vehicle to cover the charge request.

6. The method of claim 5, wherein determining that sufficient funds are associated with the vehicle to cover the charge request comprises obtaining preauthorization from an issuer associated with an account for the vehicle.

7. The method of claim 5, wherein determining that sufficient funds are associated with the vehicle to cover the charge request comprises determining a balance associated with the vehicle from a distributed ledger.

8. The method of claim 1, wherein the transformed version of the dynamic verification value is also generated based on a token stored in relation to the vehicle.

9. The method of claim 1, wherein the dynamic verification value comprises a randomly generated numeric value.

10. A charge node comprising:
a charging plate for wireless power transfer;
a processor; and
a memory including instructions that, when executed with the processor, cause the charge node to, at least:
receive, from the charging plate, a request to access power resources, the request related to an electric vehicle in proximity of the charging plate, wherein the request is received wirelessly;
provide, to the electric vehicle, a dynamic verification value to be used in authentication of the electric vehicle, the dynamic verification value comprising a value that is associated with the electric vehicle;
receive, from the electric vehicle, a transformed version of the dynamic verification value generated by the electric vehicle, wherein the transformed version of the dynamic verification value comprises an output of a transformation algorithm at the electric vehicle that transforms the dynamic verification value;
independently generate, based at least in part on the dynamic verification value and using a same transformation algorithm as the transformation of the electric vehicle, an expected verification value; and
determine whether to authorize the request based on a determination as to whether the transformed version of the dynamic verification value matches the expected verification value.

11. The charge node of claim 10, wherein the transformed version of the dynamic verification value is further generated using secret data stored independently by both the electric vehicle and the charge node.

12. The charge node of claim 11, wherein the secret data is distributed to the charge node prior to the request.

13. The charge node of claim 11, wherein the secret data is provisioned onto the electric vehicle by a beacon in proximity to the electric vehicle.

14. The charge node of claim 11, wherein the secret data is specific to the electric vehicle.

15. The charge node of claim 10, wherein the secret data is specific to a fleet of electric vehicles.

16. The charge node of claim 10, wherein the instructions further cause the charge node to access a distributed ledger maintained by the charge node to obtain information about the vehicle, wherein the determination to authorize the request is also based on the information about the electric vehicle.

17. The charge node of claim 10, wherein upon completion of the request, instructions further cause the charge node to:
update the distributed ledger by appending a transaction record associated with the request; and
distribute the updated distributed ledger to one or more additional charge nodes.

18. The charge node of claim 10, wherein the charge node is included in a network of charge nodes that is geographically distributed throughout a region.

19. A non-transitory computer-readable media collectively storing computer-executable instructions that upon execution cause one or more computing devices to collectively perform acts comprising:
receiving, from a wireless power transfer ("WPT") charging station, a request to access power resources, the request related to an electric vehicle in proximity of the WPT charging station, wherein the request is received wirelessly;
providing, to the electric vehicle, a dynamic verification value to be used in authentication of the electric vehicle, the dynamic verification value comprising a value that is associated with the electric vehicle;

receiving, from the electric vehicle, a transformed version of the dynamic verification value generated by the electric vehicle, wherein the transformed version of the dynamic verification value comprises an output of a transformation algorithm at the electric vehicle that transforms the dynamic verification value;

independently generating, based at least in part on the dynamic verification value and using a same transformation algorithm as the transformation of the electric vehicle, an expected verification value; and determining whether to authorize the request based on a determination as to whether the transformed version of the dynamic verification value matches the expected verification value.

20. The non-transitory computer-readable media of claim 19, wherein the transformed version of the dynamic verification value is generated by applying a hash algorithm to the dynamic verification value.

\* \* \* \* \*